(12) United States Patent
Laor et al.

(10) Patent No.: US 6,831,923 B1
(45) Date of Patent: *Dec. 14, 2004

(54) PIPELINED MULTIPLE ISSUE PACKET SWITCH

(75) Inventors: Michael Laor, Sunnyvale, CA (US); Martin Cieslak, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/549,875

(22) Filed: Apr. 17, 2000

Related U.S. Application Data (63) Continuation of application No. 08/511,146, filed on Aug. 4, 1995.

(51) Int. Cl.[7] .......................... H04L 12/28; H04L 12/56
(52) U.S. Cl. ...................... 370/412; 370/394; 370/428; 370/429
(58) Field of Search ................................ 370/394, 412, 370/389, 392, 401, 428, 429, 229, 230, 231, 235, 391, 465, 411, 413

(56) References Cited

U.S. PATENT DOCUMENTS 4,131,767 A  12/1978  Weinstein (List continued on next page.)

FOREIGN PATENT DOCUMENTS

| EP | 0 384 758 | 2/1990 |
| EP | 0 431 751 A1 | 11/1990 |
| EP | 0/567 217 A2 | 10/1993 |
| WO | WO94/01828 | 1/1994 |
| WO | WO95/20850 | 8/1995 |
| WO | WO93/07569 | 4/1996 |
| WO | WO93/07692 | 4/1996 |

(List continued on next page.)

OTHER PUBLICATIONS

Esaki, et al., "Datagram Delivery in an ATM–Internet," IEICE Transactions on Communications vol. E77–B, No. 3, (1994) Mar., Tokyo, Japan.

(List continued on next page.)

*Primary Examiner*—Wellington Chin
*Assistant Examiner*—Chuong Ho
(74) *Attorney, Agent, or Firm*—Beyer, Weaver & Thomas, LLP.

(57) ABSTRACT

A pipelined multiple issue architecture for a link layer or protocol layer packet switch, which processes packets independently and asynchronously, but reorders them into their original order, thus preserving the original incoming packet order. Each stage of the pipeline waits for the immediately previous stage to complete, thus causing the packet switch to be self-throttling and thus allowing differing protocols and features to use the same architecture, even if possibly requiring differing processing times. The multiple issue pipeline is scaleable to greater parallel issue of packets, and tunable to differing switch engine architectures, differing interface speeds and widths, and differing clock rates and buffer sizes. The packet switch comprises a fetch stage, which fetches the packet header into one of a plurality of fetch caches, a switching stage comprising a plurality of switch engines, each of which independently and asynchronously reads from corresponding fetch caches, makes switching decisions, and write to a reorder memory, a reorder engine which reads from the reorder memory in the packets' original order, and a post-processing stage, comprising a post-process queue and a post-process engine, which performs protocol-specific post-processing on the packets.

8 Claims, 5 Drawing Sheets

An EXAMPLE OF A FOUR WAY L3 SWITCH (max 14 packets in the pipe)

U.S. PATENT DOCUMENTS

| | | |
|---|---|---|
| 4,161,719 A | 7/1979 | Parikh et al. |
| 4,316,284 A | 2/1982 | Howson |
| 4,397,020 A | 8/1983 | Howson |
| 4,419,728 A | 12/1983 | Larson |
| 4,424,565 A | 1/1984 | Larson |
| 4,437,087 A | 3/1984 | Petr |
| 4,438,511 A | 3/1984 | Baran |
| 4,439,763 A | 3/1984 | Limb |
| 4,445,213 A | 4/1984 | Baugh et al. |
| 4,446,555 A | 5/1984 | Devault et al. |
| 4,456,957 A | 6/1984 | Schieltz |
| 4,464,658 A | 8/1984 | Thelen |
| 4,499,576 A | 2/1985 | Fraser |
| 4,506,358 A | 3/1985 | Montgomery |
| 4,507,760 A | 3/1985 | Fraser |
| 4,532,626 A | 7/1985 | Flores et al. |
| 4,644,532 A | 2/1987 | George et al. |
| 4,646,287 A | 2/1987 | Larson et al. |
| 4,677,423 A | 6/1987 | Benvenuto et al. |
| 4,679,189 A | 7/1987 | Olson et al. |
| 4,679,227 A | 7/1987 | Hughes-Hartogs |
| 4,723,267 A | 2/1988 | Jones et al. |
| 4,731,816 A | 3/1988 | Hughes-Hartogs |
| 4,750,136 A | 6/1988 | Arpin et al. |
| 4,757,495 A | 7/1988 | Decker et al. |
| 4,763,191 A | 8/1988 | Gordon et al. |
| 4,769,810 A | 9/1988 | Eckberg, Jr. et al. |
| 4,769,811 A | 9/1988 | Eckberg, Jr. et al. |
| 4,771,425 A | 9/1988 | Baran et al. |
| 4,819,228 A | 4/1989 | Baran et al. |
| 4,827,411 A | 5/1989 | Arrowood et al. |
| 4,833,706 A | 5/1989 | Hughes-Hartogs |
| 4,835,737 A | 5/1989 | Herrig et al. |
| 4,879,551 A | 11/1989 | Georgiou et al. |
| 4,893,306 A | 1/1990 | Chao et al. |
| 4,903,261 A | 2/1990 | Baran et al. |
| 4,922,486 A | 5/1990 | Lidinsky et al. |
| 4,933,937 A | 6/1990 | Konishi |
| 4,960,310 A | 10/1990 | Cushing |
| 4,962,497 A | 10/1990 | Ferenc et al. |
| 4,962,532 A | 10/1990 | Kasirai et al. |
| 4,965,772 A | 10/1990 | Daniel et al. |
| 4,970,678 A | 11/1990 | Sladowski et al. |
| 4,979,118 A | 12/1990 | Kheradpir |
| 4,980,897 A | 12/1990 | Decker et al. |
| 4,991,169 A | 2/1991 | Davis et al. |
| 5,003,595 A | 3/1991 | Collins et al. |
| 5,014,265 A | 5/1991 | Hahne et al. |
| 5,020,058 A | 5/1991 | Holden et al. |
| 5,033,076 A | 7/1991 | Jones et al. |
| 5,054,034 A | 10/1991 | Hughes-Hartog |
| 5,059,925 A | 10/1991 | Weisbloom |
| 5,072,449 A | 12/1991 | Enns et al. |
| 5,088,032 A | 2/1992 | Bosack |
| 5,095,480 A | 3/1992 | Fenner |
| 5,115,431 A | 5/1992 | Williams et al. |
| 5,128,945 A | 7/1992 | Enns et al. |
| 5,136,580 A | 8/1992 | Videlock et al. |
| 5,166,930 A | 11/1992 | Braff et al. |
| 5,199,049 A | 3/1993 | Wilson |
| 5,206,886 A | 4/1993 | Bingham |
| 5,208,811 A | 5/1993 | Kashio et al. |
| 5,212,686 A | 5/1993 | Joy et al. |
| 5,224,099 A | 6/1993 | Corbalis et al. |
| 5,226,120 A | 7/1993 | Brown et al. |
| 5,228,062 A | 7/1993 | Bingham |
| 5,229,994 A | 7/1993 | Balzano et al. |
| 5,237,564 A | 8/1993 | Lespagnol et al. |
| 5,241,682 A | 8/1993 | Bryant et al. |
| 5,243,342 A | 9/1993 | Kattemalalavadi et al. |
| 5,243,596 A | 9/1993 | Port et al. |
| 5,247,516 A | 9/1993 | Bernstein et al. |
| 5,249,178 A | 9/1993 | Kurano et al. |
| 5,253,251 A | * 10/1993 | Aramaki ..................... 370/394 |
| 5,255,291 A | 10/1993 | Holden et al. |
| 5,260,933 A | 11/1993 | Rouse |
| 5,260,978 A | 11/1993 | Fleischer et al. |
| 5,268,592 A | 12/1993 | Bellamy et al. |
| 5,268,900 A | 12/1993 | Hluchj et al. |
| 5,271,004 A | 12/1993 | Proctor et al. |
| 5,274,631 A | 12/1993 | Bhardwaj |
| 5,274,635 A | 12/1993 | Rahman et al. |
| 5,274,643 A | 12/1993 | Fisk |
| 5,280,470 A | 1/1994 | Buhrke et al. |
| 5,280,480 A | 1/1994 | Pitt et al. |
| 5,280,500 A | 1/1994 | Mazzola et al. |
| 5,283,783 A | 2/1994 | Nguyen et al. |
| 5,287,103 A | 2/1994 | Kasprzyk et al. |
| 5,287,453 A | 2/1994 | Roberts |
| 5,291,482 A | 3/1994 | McHarg et al. |
| 5,305,311 A | 4/1994 | Lyles |
| 5,307,343 A | 4/1994 | Bostica et al. |
| 5,309,437 A | 5/1994 | Perlman et al. |
| 5,311,509 A | 5/1994 | Heddes et al. |
| 5,313,454 A | 5/1994 | Bustini et al. |
| 5,313,582 A | 5/1994 | Hendel et al. |
| 5,317,562 A | 5/1994 | Nardin et al. |
| 5,319,644 A | 6/1994 | Liang |
| 5,327,421 A | 7/1994 | Hiller et al. |
| 5,331,637 A | 7/1994 | Francis et al. |
| 5,339,311 A | 8/1994 | Turner |
| 5,345,445 A | 9/1994 | Hiller et al. |
| 5,345,446 A | 9/1994 | Hiller et al. |
| 5,359,592 A | 10/1994 | Corbalis et al. |
| 5,361,250 A | 11/1994 | Nguyen et al. |
| 5,361,256 A | 11/1994 | Doeringer et al. |
| 5,361,259 A | 11/1994 | Hunt et al. |
| 5,365,524 A | 11/1994 | Hiller et al. |
| 5,367,517 A | 11/1994 | Cidon et al. |
| 5,371,852 A | 12/1994 | Attanasio et al. |
| 5,386,567 A | 1/1995 | Lien et al. |
| 5,390,170 A | 2/1995 | Sawant et al. |
| 5,390,175 A | 2/1995 | Hiller et al. |
| 5,394,394 A | 2/1995 | Crowther et al. |
| 5,394,402 A | 2/1995 | Ross |
| 5,400,325 A | 3/1995 | Chatwani et al. |
| 5,408,469 A | 4/1995 | Opher et al. |
| 5,412,646 A | * 5/1995 | Cyr et al. ................... 370/411 |
| 5,414,705 A | 5/1995 | Therasse et al. |
| 5,416,842 A | 5/1995 | Aziz |
| 5,422,880 A | 6/1995 | Heitkamp et al. |
| 5,422,882 A | 6/1995 | Hiller et al. |
| 5,423,002 A | 6/1995 | Hart |
| 5,426,636 A | 6/1995 | Hiller et al. |
| 5,428,607 A | 6/1995 | Hiller et al. |
| 5,430,715 A | 7/1995 | Corbalis et al. |
| 5,430,729 A | 7/1995 | Rahnema |
| 5,442,457 A | 8/1995 | Najafi |
| 5,442,630 A | 8/1995 | Gagliardi et al. |
| 5,452,297 A | 9/1995 | Hiller et al. |
| 5,473,599 A | 12/1995 | Li et al. |
| 5,473,607 A | 12/1995 | Hausman et al. |
| 5,477,541 A | 12/1995 | White et al. |
| 5,483,523 A | 1/1996 | Nederlof |
| 5,485,455 A | 1/1996 | Dobbins et al. |
| 5,490,140 A | 2/1996 | Abensour et al. |
| 5,490,258 A | 2/1996 | Fenner |
| 5,491,687 A | 2/1996 | Christensen et al. |
| 5,491,804 A | 2/1996 | Heath et al. |
| 5,497,371 A | 3/1996 | Ellis et al. |
| 5,509,006 A | 4/1996 | Wilford et al. |

| | | |
|---|---|---|
| 5,517,494 A | 5/1996 | Green |
| 5,519,704 A | 5/1996 | Farinacci et al. |
| 5,519,858 A | 5/1996 | Walton et al. |
| 5,526,489 A | 6/1996 | Nilakantan et al. |
| 5,530,963 A | 6/1996 | Moore et al. |
| 5,535,195 A | 7/1996 | Lee |
| 5,539,734 A | 7/1996 | Burwell et al. |
| 5,541,911 A | 7/1996 | Nilakantan et al. |
| 5,546,370 A | 8/1996 | Ishikawa |
| 5,548,593 A | 8/1996 | Peschi |
| 5,555,244 A | 9/1996 | Gupta et al. |
| 5,561,669 A | 10/1996 | Lenney et al. |
| 5,583,862 A | 12/1996 | Callon |
| 5,590,122 A | 12/1996 | Sandorfi et al. |
| 5,592,470 A | 1/1997 | Rudrapatna et al. |
| 5,598,581 A | 1/1997 | Daines et al. |
| 5,600,798 A | 2/1997 | Cherukuri et al. |
| 5,604,868 A | 2/1997 | Komine et al. |
| 5,608,726 A | 3/1997 | Virgile |
| 5,608,733 A | 3/1997 | Vallee et al. |
| 5,617,417 A | 4/1997 | Sathe et al. |
| 5,617,421 A | 4/1997 | Chin et al. |
| 5,630,125 A | 5/1997 | Zellwegger |
| 5,631,908 A | 5/1997 | Saxe |
| 5,632,021 A | 5/1997 | Jennings et al. |
| 5,634,010 A | 5/1997 | Ciscon et al. |
| 5,638,359 A | 6/1997 | Peltola et al. |
| 5,644,718 A | 7/1997 | Belove et al. |
| 5,659,684 A | 8/1997 | Giovannoni et al. |
| 5,666,353 A | 9/1997 | Klausmeier et al. |
| 5,673,265 A | 9/1997 | Gupta et al. |
| 5,678,006 A | 10/1997 | Valizadeh et al. |
| 5,680,116 A | 10/1997 | Hashimoto et al. |
| 5,684,797 A | 11/1997 | Aznar |
| 5,687,324 A | 11/1997 | Green et al. |
| 5,689,506 A | 11/1997 | Chiussi et al. |
| 5,694,390 A | 12/1997 | Yamato et al. |
| 5,724,351 A | 3/1998 | Chao et al. |
| 5,748,186 A | 5/1998 | Raman |
| 5,748,617 A | 5/1998 | McClain, Jr. |
| 5,802,054 A | 9/1998 | Bellenger |
| 5,835,710 A | 11/1998 | Nagami et al. |
| 5,854,903 A | 12/1998 | Morrison et al. |
| 5,856,981 A | 1/1999 | Voelker |
| 5,892,924 A | 4/1999 | Lyon et al. |
| 5,898,686 A | 4/1999 | Virgile |
| 5,903,559 A | 5/1999 | Acharya et al. |
| 6,147,996 A * | 11/2000 | Laor et al. .................. 370/394 |

OTHER PUBLICATIONS

Chowdhury et al., "Alternative Banddwidth Allocation Algorithms for Packet Video in ATM Networks", 1992, IEEE Infocom 92, pp. 1061–1068.

Zhang, et al., "Rate–Controlled Static–Priority Queuing", 1993, IEEE, pp. 227–236.

IBM, "Method and Apparatus for the Statistical Multiplexing of Voice, Data and Image Signals", Nov. 1992, IBM Technical Data Bulletin n6 11–92, pp. 409–411.

William Stallings, Data and Computer Communications, pp: 329–333.

Allen, M., "Novell IPX Over Various WAN Media (IPX–WAN)", Network Working Group, RFC 1551, Dec. 1993, pp. 1–22.

Becker D., 3c589.c: A 3c589 EtherLink3 ethernet driver for linux, becker@CESDIS.gsfc.nasa.gov, May 3, 1994, pp. 1–13.

Pei, et al., "Putting Routing Tables In Silicon", IEEE Network Magazine, Jan. 1992, p. 42–50.

Perkins, D., "Requirements for an Internet Standard Point–to–Point Protocol", Network Working Group, RFC 1547, Dec. 1993, pp. 1–19.

Simpson, W., "The Point–to–Point Protocol (PPP)", Network Working Group, RFC 1548, Dec. 1993, pp. 1–53.

Tusuchiya, P.F., "A Search Algorithm For Table Entries with NonContinguous Wildcarding", Abstract, Bellcore.

* cited by examiner

An EXAMPLE OF A FOUR WAY L3 SWITCH (max 14 packets in the pipe)

PIPELINED MULTIPLE ISSUE PACKET SWITCH

This application is a continuation of application Ser. No. 08/511,146, filed Aug. 4, 1995.

BACKGROUND OF THE INVENTION

1. Field of the Invention

This invention relates to a pipelined multiple issue packet switch.

2. Description of Related Art

When computers are coupled together into networks for communication, it is known to couple networks together and to provide a switching device which is coupled to more than one network. The switching device receives packets from one network and retransmits those packets (possibly in another format) on another network. In general, it is desirable for the switching device to operate as quickly as possible.

However, there are several constraints under which the switching device must operate. First, packets may encapsulate differing protocols, and thus may differ significantly in length and in processing time. Second, when switching packets from one network to another, it is generally required that packets are re-transmitted in the same order as they arrive. Because of these two constraints, known switching device architectures are not able to take advantage of significant parallelism in switching packets.

It is also desirable to account ahead of time for future improvements in processing hardware, such as bandwidth and speed of a network interface, clock speed of a switching processor, and memory size of a packet buffer, so that the design of the switching device is flexible and scaleable with such improvements.

The following U.S. Patents may be pertinent:

- U.S. Pat. No. 4,446,555 to Devault et al., "Time Division Multiplex Switching Network For Multiservice Digital Networks";
- U.S. Pat. No. 5,212,686 to Joy et al., "Asynchronous Time Division Switching Arrangement and A Method of Operating Same";
- U.S. Pat. No. 5,271,004 to Proctor et al., "Asynchronous Transfer Mode Switching Arrangement Providing Broadcast Transmission"; and
- U.S. Pat. No. 5,307,343 to Bostica et al., "Basic Element for the Connection Network of A Fast Packet Switching Node".

Accordingly, it would be advantageous to provide an improved architecture for a packet switch, which can make packet switching decisions responsive to link layer (ISO level 2) or protocol layer (ISO level 3) header information, which is capable of high speed operation at relatively low cost, and which is flexible and scaleable with future improvements in processing hardware.

SUMMARY OF THE INVENTION

The invention provides a pipelined multiple issue link layer or protocol layer packet switch, which processes packets independently and asynchronously, but reorders them into their original order, thus preserving the original incoming packet order. Each stage of the pipeline waits for the immediately previous stage to complete, thus causing the packet switch to be self-throttling and thus allowing differing protocols and features to use the same architecture, even if possibly requiring differing processing times. The multiple issue pipeline is scaleable to greater parallel issue of packets, and tunable to differing switch engine architectures, differing interface speeds and widths, and differing clock rates and buffer sizes.

In a preferred embodiment, the packet switch comprises a fetch stage, which fetches the packet header into one of a plurality of fetch caches, a switching stage comprising a plurality of switch engines, each of which independently and asynchronously reads from corresponding fetch caches, makes switching decisions, and writes to a reorder memory, a reorder engine which reads from the reorder memory in the packets' original order, and a post-processing stage, comprising a post-process queue and a post-process engine, which performs protocol-specific post-processing on the packets.

BRIEF DESCRIPTION OF THE DRAWINGS

FIG. 2 shows a block diagram of a packet switch. FIG. 2 comprises FIG. 2A and FIG. 2B collectively.

DESCRIPTION OF THE PREFERRED EMBODIMENT

In the following description, a preferred embodiment of the invention is described with regard to preferred process steps, data structures, and switching techniques. However, those skilled in the art would recognize, after perusal of this application, that embodiments of the invention may be implemented using a set of general purpose computers operating under program control, and that modification of a set of general purpose computers to implement the process steps and data structures described herein would not require undue invention.

The present invention may be used in conjunction with technology disclosed in the following copending application.

application Ser. No. 08/229,289, filed Apr. 18, 1994, in the name of inventors Bruce A. Wilford, Bruce Sherry, David Tsiang, and Anthony Li, titled "Packet Switching Engine".

This application is hereby incorporated by reference as if fully set forth herein, and is referred to herein as the "Packet Switching Engine disclosure".

Pipelined, Multiple Issue Packet Switch

Figure 1:
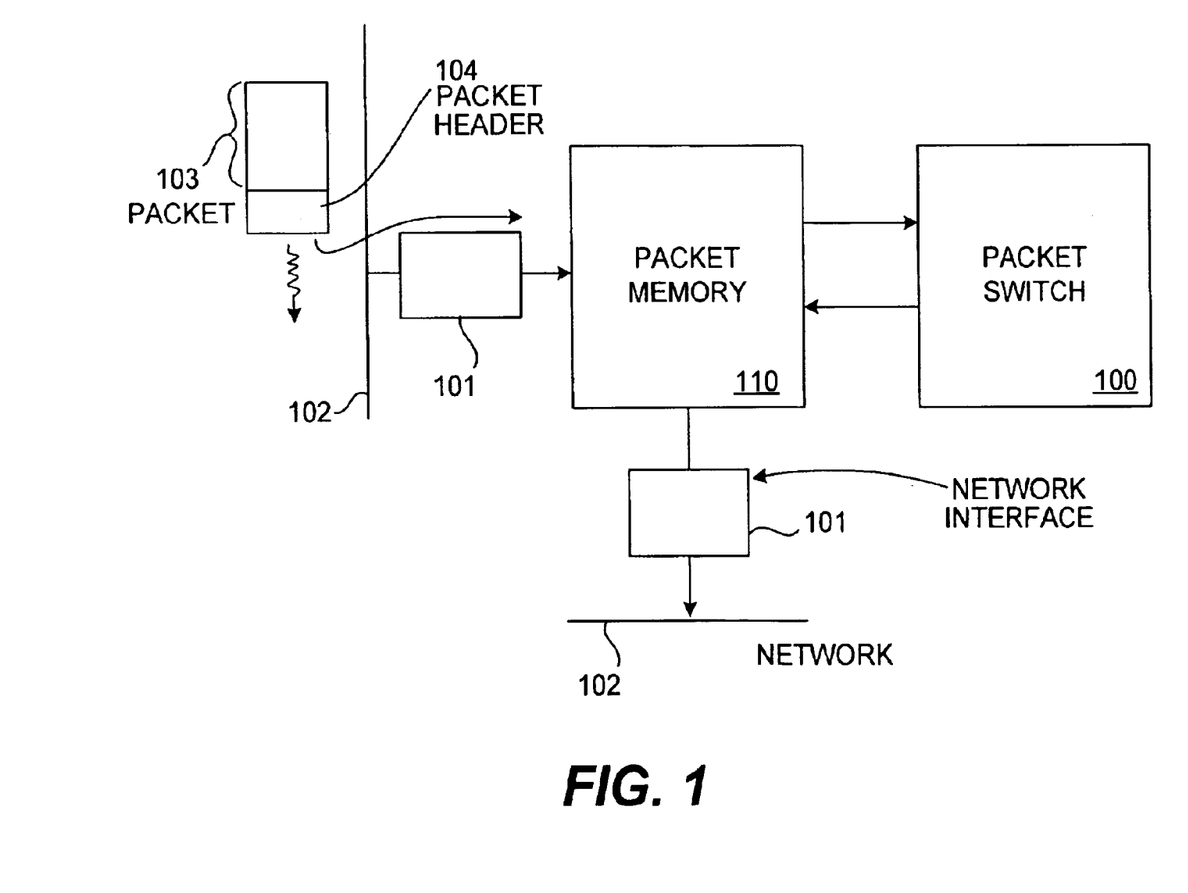
FIG. 1 shows the placement of a packet switch in an internetwork.

FIG. 1 shows the placement of a packet switch in an internetwork.

A packet switch 100 is coupled to a first network interface 101 coupled to a first network 102 and a second network interface 101 coupled to a second network 102. When a packet 103 is recognized by the first network interface 101 (i.e., the MAC address of the packet 103 is addressed to the packet switch 100 or to an address known to be off the first network 102), the packet 103 is stored in a packet memory 110 and a pointer to a packet header 104 for the packet 103 is generated.

In a preferred embodiment, the packet header 104 comprises a link layer (level 2) header, and a protocol layer (level 3) header. The link layer header, sometimes called a "MAC" (media access control) header, comprises information for communicating the packet 103 on a network 102 using particular media, such as the first network 102. The protocol layer header comprises information for level 3 switching of the packet 103 among networks 102. The link layer header comprises information for level 2 switching (i.e., bridging). For example, the link layer header may comprise an ethernet, FDDI, or token ring header, while the protocol layer header may comprise an IP header. Also, there are hybrid switching techniques which respond to the both the level 2 and the level 3 headers, as well as those which respond to level 4 headers (such as extended access lists). Those skilled in the art will recognize, after perusal of this application, that other types of packet headers or trailers are within the scope and spirit of the invention, and that adapting the invention to switching such packet headers would not involve invention or undue experimentation.

The packet switch 100 reads the packet header 104 and performs two tasks—(1) it rewrites the packet header 104, if necessary, to conform to protocol rules for switching the packet 103, and (2) it queues the packet 103 for transmission on an output network interface 101 and thus an output network 102. For example, if the output network 102 requires a new link layer header, the packet switch 100 rewrites the link layer header. If the protocol layer header comprises a count of the number of times the packet 103 has been switched, the packet switch 100 increments or decrements that count, as appropriate, in the protocol layer header.

Figure 2A:
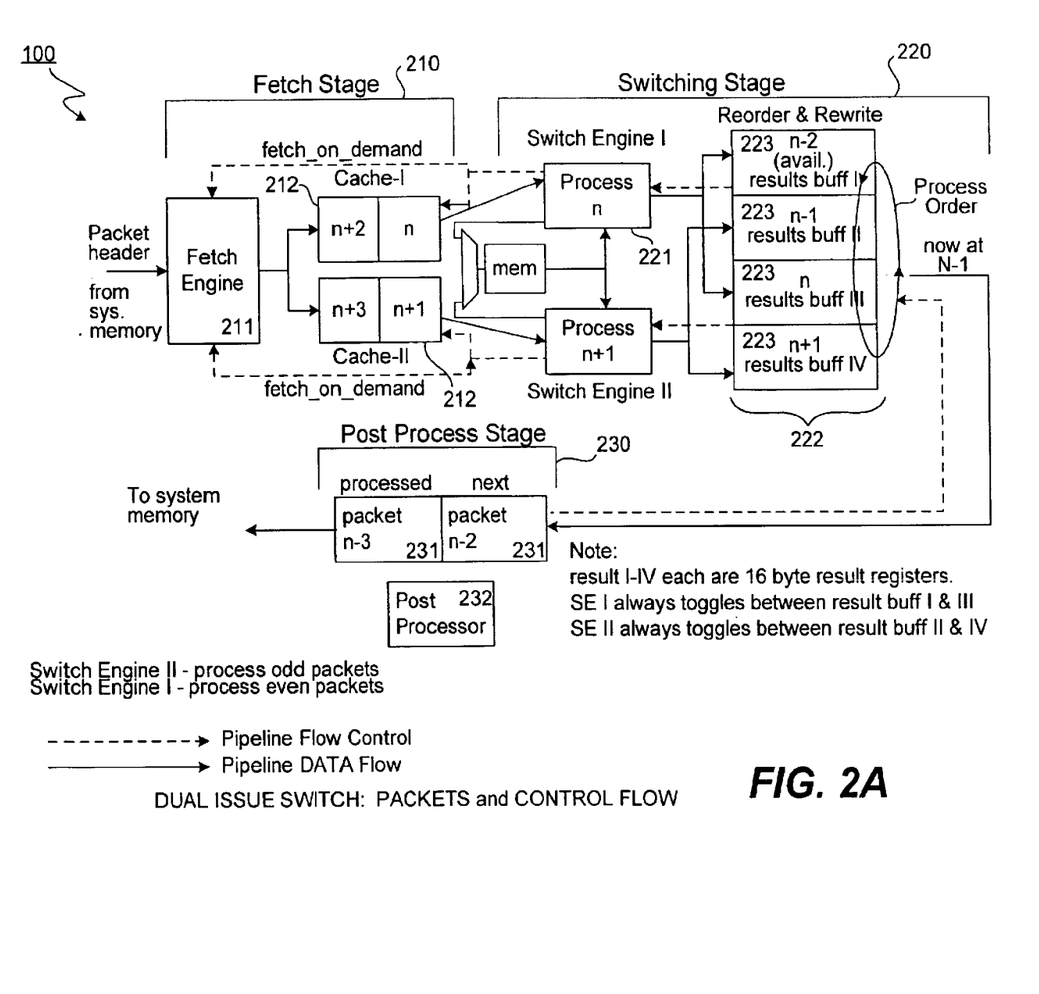
Figure 2B:
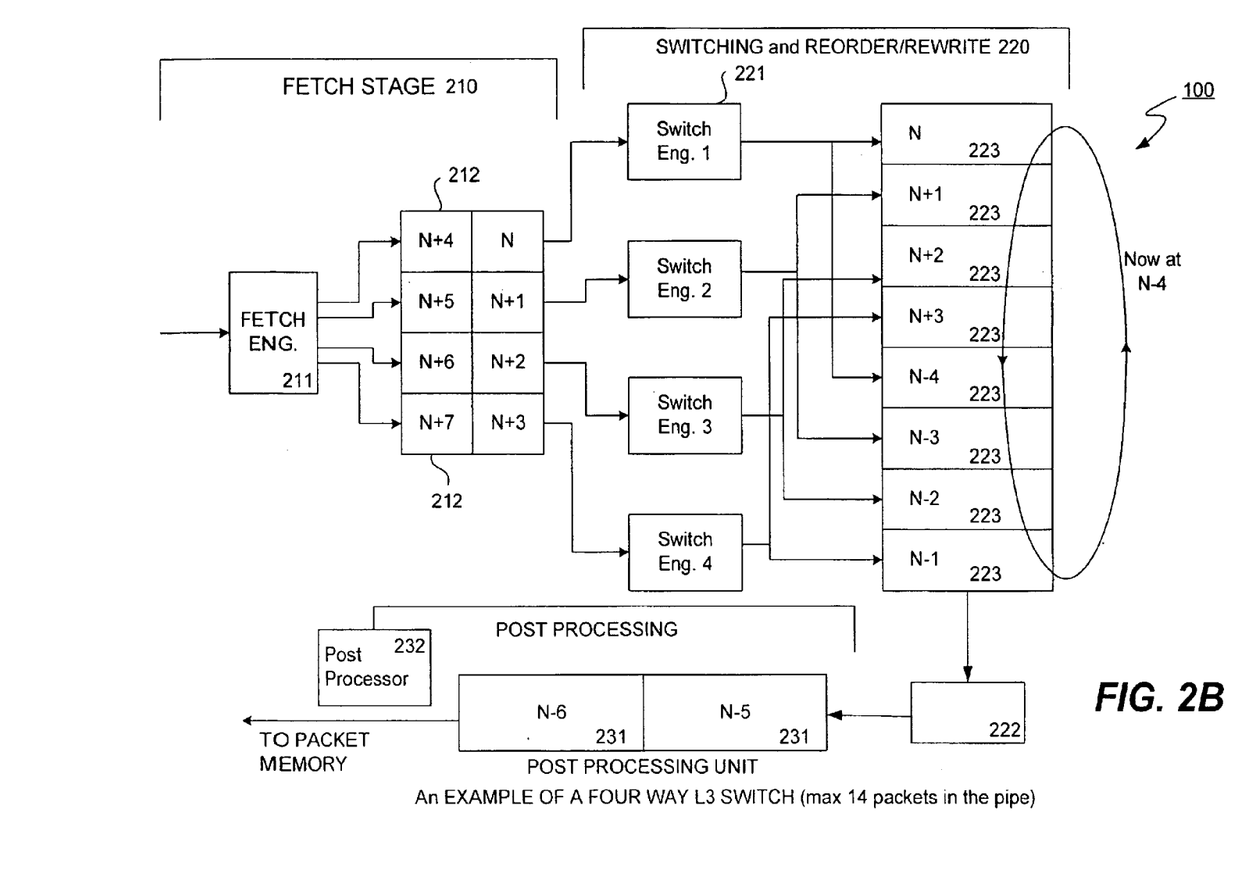

FIG. 2 shows a block diagram of a packet switch. FIG. 2 comprises FIG. 2A and FIG. 2B collectively.

The packet switch 100 comprises a fetch stage 210, a switching stage 220, and a post-processing stage 230.

The pointer to the packet header 104 is coupled to the fetch stage 210. The fetch stage 210 comprises a fetch engine 211 and a plurality of (preferably two) fetch caches 212. Each fetch cache 212 comprises a double buffered FIFO queue.

FIG. 2A shows a preferred embodiment in which there are two fetch caches 212, while FIG. 2B shows an alternative preferred embodiment in which there are four fetch caches 212.

In response to a signal from the switching stage 220, the fetch engine 211 prefetches a block of M bytes of the packet header 104 and stores that block in a selected FIFO queue of a selected fetch cache 212. In a preferred embodiment, the value of M, the size of the block, is independent of the protocol embodied in the protocol link layer, and is preferably about 64 bytes. In alternative embodiments, the value of M may be adjusted, e.g., by software, so that the packet switch 100 operates most efficiently with a selected mix of packets 103 it is expected to switch.

When the block of M bytes does not include the entire packet header 104, the fetch engine 211 fetches, in response to a signal from the fetch cache 212, a successive block of L additional bytes of the packet header 104 and stores those blocks in the selected FIFO queue of the selected fetch cache 212, thus increasing the amount of data presented to the switching stage 220. In a preferred embodiment, the value of L, the size of the additional blocks, is equal to the byte width of an interface to the packet memory 110, and in a preferred embodiment is about 8 bytes.

After storing at least a portion of a packet header 104 in a fetch cache 212, the fetch engine 211 reads the next packet header 104 and proceeds to read that packet header 104 and store it in a next selected fetch cache 212. The fetch caches 212 are selected for storage in a round-robin manner. Thus when there are N fetch caches 212, each particular fetch cache 212 receives every Nth packet header 104 for storage; when there are two fetch caches 212, each particular fetch cache 212 receives every other packet header 104 for storage.

Each fetch cache 212 is double buffered, so that the fetch engine 211 may write a new packet header 104 to a fetch cache 212 while the corresponding switch engine 221 is reading from the fetch cache 212. This is in addition to the fetch on demand operation described above, in which the fetch engine 211 writing successive blocks of additional bytes of an incomplete packet header 104 in response to a signal from a switch engine 221. Thus each particular fetch cache 212 pipelines up to two packet headers 104; when there are N fetch caches 212, there are up to 2N packet headers 104 pipelined in the fetch stage 210.

More generally, there may be N fetch caches 212, each of which comprises B buffers, for a total of BN buffers. The fetch engine 211 writes new packet headers 104 in sequence to the N fetch caches 212 in order, and when the fetch engine 211 returns to a fetch cache 212 after writing in sequence to all other fetch caches 212, it writes in sequence to the next one of the B buffers within that fetch cache 212.

As shown below, the switching stage 220 comprises an identical number N of switch engines 221, each of which reads in sequence from one of the B buffers of its designated fetch cache 212, returning to read from a buffer after reading in sequence from all other buffers in that fetch cache 212.

In FIG. 2A, a preferred embodiment in which there are two fetch caches 212, there are four packet headers 104 pipelined in the fetch stage 210, labeled n+3, n+2, n+1, and n. In FIG. 2B, an alternative preferred embodiment in which there are four fetch caches 212, there are eight packet headers 104 pipelined in the fetch stage 210, labeled n+7, n+6, n+5, n+4, n+3, n+2, n+1, and n.

Figure 3:
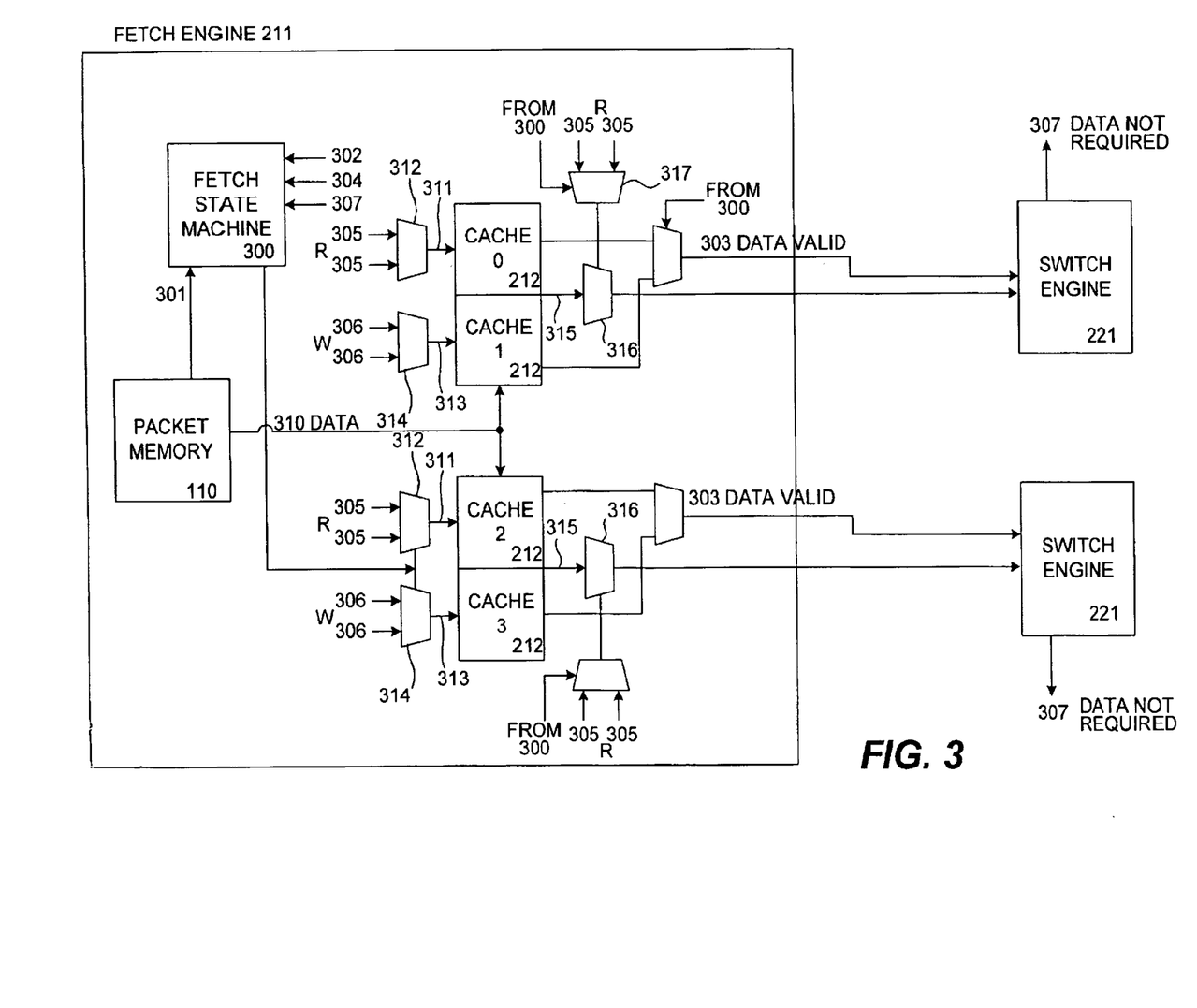
FIG. 3 shows a fetch stage for the packet switch.

The fetch stage 210 is further described with regard to FIG. 3.

The switching stage 220 comprises a plurality of switch engines 221, one for each fetch cache 212, and a reorder/rewrite engine 222.

Each switch engine 221 is coupled to a corresponding fetch cache 212. Each switch engine 221 independently and asychronously reads from its corresponding fetch cache 212, makes a switching decision, and writes its results to one of a plurality of (preferably two) reorder/rewrite memories 223 in the reorder/rewrite engine 222. Thus, when there are N fetch caches 212, there are also N switch engines 221, and when there are K reorder/rewrite memories 223 for each switch engine 221, there are KN reorder/rewrite memories 223 in N sets of K.

FIG. 2A shows a preferred embodiment in which there are two switch engines 221 and four reorder/rewrite memories 223, while FIG. 2B shows an alternative preferred embodiment in which there are four switch engines 221 and eight reorder/rewrite memories 223.

In a preferred embodiment, each switch engine 221 comprises a packet switch engine as shown in the Packet Switching Engine disclosure. The switching results and other data (e.g., statistical information) written into the reorder/rewrite memories 223 comprise information regarding how to rewrite the packet header 104 and to which network interface 101 to output the packet 103. Preferably, this information comprises results registers as described in the Packet Switching Engine disclosure, and includes a pointer to the packet header 104 in the packet memory 110.

Preferably, a single integrated circuit chip comprises significant circuits of at least one, and preferably more than one, switch engine 221.

As described in the Packet Switching Engine disclosure, each switch engine 221 reads instructions from a "tree memory" comprising instructions for reading and interpreting successive bytes of the packet header 104. In a preferred embodiment, the tree memory comprises a set of memory registers coupled to the switch engine 221. In an alternative embodiment, at least some of the tree memory may be cached on the integrated circuit chip for the switch engine 221.

The reorder/rewrite engine 222 reads from the reorder/rewrite memories 223 in a preselected order. The N sets of K reorder/rewrite memories 223 are interleaved, so that results from the switch engines 221 are read in a round-robin manner. Thus, output from the reorder/rewrite engine 222 is in the original order in which packets 103 arrived at the packet switch 100.

Thus, each one of the switch engines 221 writes in sequence to its K designated reorder/rewrite memories 223, returning to one of its designated reorder/rewrite memories 223 after writing in sequence to its other designated reorder/rewrite memories 223. In parallel, the reorder/rewrite engine 222 reads in sequence from all the NK reorder/rewrite memories 223, and returns to one of the NK reorder/rewrite memories 223 after reading in sequence from all other reorder/rewrite memories 223.

In FIG. 2A, a preferred embodiment in which there are two switch engines 221 and four reorder/rewrite memories 223, there are four packet headers 104 pipelined in the switching stage 220, labeled n+1, n, n−1, and n−2 (now available). In FIG. 2B, an alternative preferred embodiment in which there are four switch engines 221 and eight reorder/rewrite memories 223, there are eight packet headers 104 pipelined in the switching stage 220, labeled n+3, n+2, n+1, n, n−1, n−2, n−3, and n−4.

The reorder/rewrite engine 222, in addition to receiving the packet headers 104 in their original order from the reorder/rewrite memories 223, may also rewrite MAC headers for the packet headers 104 in the packet memory 110, if such rewrite is called for by the switching protocol.

The post-processing stage 230 comprises a post-processing queue 231 and a post-processor 232.

The reorder/rewrite engine 222 writes the packet headers 104 into a FIFO queue of post-processing memories 231 in the order it reads them from the reorder/rewrite memories 223. Because the queue is a FIFO queue, packet headers 104 leave the post-processing stage 230 in the same order they enter, which is the original order in which packets 103 arrived at the packet switch 100.

The post-processor 232 performs protocol-specific operations on the packet header 104. For example, the post-processor 232 increments hop counts and recomputes header checksums for IP packet headers 104. The post-processor 232 then queues the packet 103 for the designated output network interface 101, or, if the packet 103 cannot be switched, discards the packet 103 or queues it for processing by a route server, if one exists.

In FIG. 2A, a preferred embodiment, and in FIG. 2B, an alternative preferred embodiment, there are two post-processing memories 231 in the FIFO queue for the post-processing stage 230. In FIG. 2A there are two packet headers 104 pipelined in the post-processing stage 230, labeled n−3 and n−2. In FIG. 2B there are two packet headers 104 pipelined in the post-processing stage 230, labeled n−6 and n−5.

FIG. 2A, a preferred embodiment, and FIG. 2B, an alternative preferred embodiment, show that there are several packet headers 104 processed in parallel by the packet switch 100. In general, where there are S switching engines 211, there are 3S+2 packet headers 104 processed in parallel by the packet switch 100. Of these, 2S packet headers 104 are stored in the fetch stage 210, S packet headers 104 are stored in the reorder/rewrite memories 223, and 2 packet headers 104 are stored in the post-processing stage 230.

In a preferred embodiment, the packet memory 110 is clocked at about 50 MHz and has a memory fetch path to the fetch stage 210 which is eight bytes wide, there are two switching engines 221, each of which operates at an average switching speed of about 250 kilopackets switched per second, and each stage of the packet switch 100 completes operation within about 2 microseconds. Although each switching engine 221 is individually only about half as fast as the pipeline processing speed, the accumulated effect when using a plurality of switching engines 221 is to add their effect, producing an average switching speed for the packet switch 100 of about 500 kilopackets switched per second when the pipeline is balanced.

In an alternative preferred embodiment, each switching engine 221 operates at an average switching speed of about 125 kilopackets switched per second, producing an average switching speed for the packet switch 100 of about 250 kilopackets switched per second when the pipeline is balanced. Because the pipeline is limited by its slowest stage, the overall speed of the packet switch 100 is tunable by adjustment of parameters for its architecture, including speed of the memory, width of the memory fetch path, size of the cache buffers, and other variables. Such tunability allows the pocket switch 100 to achieve satisfactory performance at a reduced cost.

Fetch Engine and Fetch Memories

FIG. 3 shows a fetch stage for the packet switch.

The fetch engine 211 comprises a state machine 300 having signal inputs coupled to the packet memory 110 and to the switching stage 220, and having signal outputs coupled to the switching stage 220, A packet ready signal 301 is coupled to the fetch engine 211 from the packet memory 110 and indicates whether there is a packet header 104 ready to be fetched. In this description of the fetch engine 211, it is presumed that packets 103 arrive quickly enough that, the packet ready signal 301 indicates that there is a packet header 104 ready to be fetched at substantially all times. If the fetch engine 211 fetches packet headers 104 quicker than those packet headers 104 arrive, at some times the fetch engine 211 (and the downstream elements of the packet switch 100) will have to wait for more packets 103 to switch.

A switch ready signal 302 is coupled to the fetch engine 211 from each of the switch engines 221 and indicates whether the switch engine 211 is ready to receive a new packet header 104 for switching.

A data available (or cache ready) signal 303 is coupled to each of the switch engines 221 from the fetch engine 211 and indicates whether a packet header 104 is present in the fetch cache 212 for switching.

A cache empty signal 304 is coupled to the fetch engine 211 from each of the fetch caches 212 and indicates whether the corresponding switch engine 211 has read all the data from the packet header 104 supplied by the fetch engine 211. A data not required signal 307 is coupled to the fetch engine 211 from each of the switch engines 211 and indicates whether the switch engine 211 needs further data loaded into the fetch cache 212.

It may occur that the switch engine 211 is able to make its switching decision without need for further data from the packet header 104, even though the switch engine 211 has read all the data from the packet header 104 supplied by the fetch engine 211. In this event, the switch engine 211 sets the data not required signal 307 to inform the fetch engine 211 that no further data should be supplied, even though the cache empty signal 304 has been triggered.

It may also occur that the switch engine 211 is able to determine that it can make its switching decision within the data already available, even if it has not made that switching decision yet. For example, in the IP protocol, it is generally possible to make the switching decision with reference only to the first 64 bytes of the packet header 104. If the switch engine 211 is able to determine that a packet header 104 is an IP packet header, it can set the data not required signal 307.

A read pointer 305 is coupled to each of the fetch caches 212 from the corresponding switch engine 221 and indicates a location in the fetch cache 212 where the switch engine 221 is about to read a word (of a packet header 104) from the fetch cache 212.

A write pointer 306 is coupled to each of the fetch caches 212 from the fetch engine 211 and indicates a location in the fetch cache 212 where the fetch engine 211 is about to write a word (of a packet header 104) to the fetch cache 212.

A first pair of fetch caches 212 (labeled "0" and "1") and a second pair of fetch caches 212 (labeled "2" and "3") each comprise dual port random access memory (RAM), preferably a pair of 16 word long by 32 bit wide dual port RAM circuits disposed to respond to addresses as a single 16 word long by 64 bit wide dual port RAM circuit.

A 64 bit wide data bus 310 is coupled to a data input for each of the fetch caches 212.

The read pointers 305 for the first pair of the fetch caches 212 (labeled as "0" and "1") are coupled to a first read address bus 311 for the fetch caches 212 using a first read address multiplexer 312. The two read pointers 305 are data inputs to the read address multiplexer 312; a select input to the read address multiplexer 312 is coupled to an output of the fetch engine 211. Similarly, the read pointers 305 for the second pair of the fetch caches 212 (labeled as "2" and "3") are coupled to a second read address bus 311 for the fetch caches 212 using a second read address multiplexer 312, and selected by an output of the fetch engine 211.

Similarly, the write pointers 306 for the first pair of the fetch caches 212 (labeled as "0" and "1") are coupled to a first write address bus 313 for the fetch caches 212 using a first write address multiplexer 314. The two write pointers 306 are data inputs to the write address multiplexer 314; a select input to the write address multiplexer 314 is coupled to an output of the fetch engine 211. Similarly, the write pointers 306 for the second pair of the fetch caches 212 (labeled as "2" and "3") are coupled to a second write address bus 313 for the fetch caches 212 using a second write address multiplexer 314, and selected by an output of the fetch engine 211.

An output 315 for the first pair of fetch caches 212 is coupled to a byte multiplexer 316. The byte multiplexer 316 selects one of eight bytes of output data, and is selected by an output of a byte select multiplexer 317. The byte select multiplexer 317 is coupled to a byte address (the three least significant bits of the read pointer 305) for each of the first pair of fetch caches 212, and is selected by an output of the fetch engine 211.

An initial value for the byte address (the three least significant bits of the read pointer 305) may be set by the state machine 300 to allow a first byte of the packet header 104 to be offset from (i.e., not aligned with) an eight-byte block in the packet memory 110. The state machine 300 resets the byte address to zero for successive sets of eight bytes to be fetched from the packet memory 110.

Similarly, an output 315 for the second pair of fetch caches 212 is coupled to a byte multiplexer 316. The byte multiplexer 316 selects one of eight bytes of output data, and is selected by an output of a byte select multiplexer 317. The byte select multiplexer 317 is coupled to a byte address (the three least significant bits of the read pointer 305) for each of the second pair of fetch caches 212, and is selected by an output of the fetch engine 211. The byte multiplexers 316 are coupled to the switching stage 220.

As described with regard to FIG. 2, the fetch engine 211 responds to the switch ready signal 302 from a switch engine 221 by prefetching the first M bytes of the packet header 104 from the packet memory 110 into the corresponding fetch cache 212. To perform this task, the fetch engine 211 selects the write pointer 306 for the corresponding fetch cache 212 using the corresponding write address multiplexer 314, writes M bytes into the corresponding fetch cache 212, and updates the write pointer 306.

As described with regard to FIG. 2, the fetch cache 212 raises the cache empty signal 304 when the read pointer 305 approaches the write pointer 306, such as when the read pointer 305 is within eight bytes of the write pointer 306. The fetch engine 211 responds to the cache empty signal 304 by fetching the next L bytes of the packet header 104 from the packet memory 110 into the corresponding fetch cache 212, unless disabled by the data not required signal 307 from the switch engine 221. To perform this task, the fetch engine 211 proceeds in like manner as when it prefetched the first M bytes of the packet header 104.

In a preferred embodiment, the fetch cache 212 includes a "watermark" register (not shown) which records an address value which indicates, when the read pointer 305 reaches that address value, that more data should be fetched. For example, the watermark register may record a value just eight bytes before the write pointer 306, so that more data will only be fetched when the switch engine 221 is actually out of data, or the watermark register may record a value more bytes before the write pointer 306, so that more data will be fetched ahead of actual need. Too-early values may result in data being fetched ahead of time without need, while too-late values may result in the switch engine 221 having to wait. Accordingly, the value recorded in the watermark register can be adjusted to better match the rate at which data is fetched to the rate at which data is used by the switch engine 221.

While the switch engine 221 reads from the fetch cache 212, the fetch engine 211 prefetches the first M bytes of another packet header 104 from the packet memory 110 into another fetch cache 212 (which may eventually comprise the other fetch cache 212 of the pair). To perform this task, the fetch engine 211 selects the write pointer 306 for the recipient fetch cache 212 using the corresponding write address multiplexer 314, writes M bytes into the recipient fetch cache 212, and updates the corresponding write pointer 306.

The switch engines 221 are each coupled to the read pointer 305 for their corresponding fetch cache 212. Each switch engine 221 independently and asynchronously reads from its corresponding fetch cache 212 and processes the packet header 104 therein. To perform this task, the switch engine 221 reads one byte at a time from the output of the output multiplexer 320 and updates the corresponding byte address (the three least significant bits of the read pointer 305). When the read pointer 305 approaches the write pointer 306, the cache low signal 304 is raised and the fetch engine 211 fetches L additional bytes "on demand".

Multiple Packet Switches in Parallel

Figure 4:
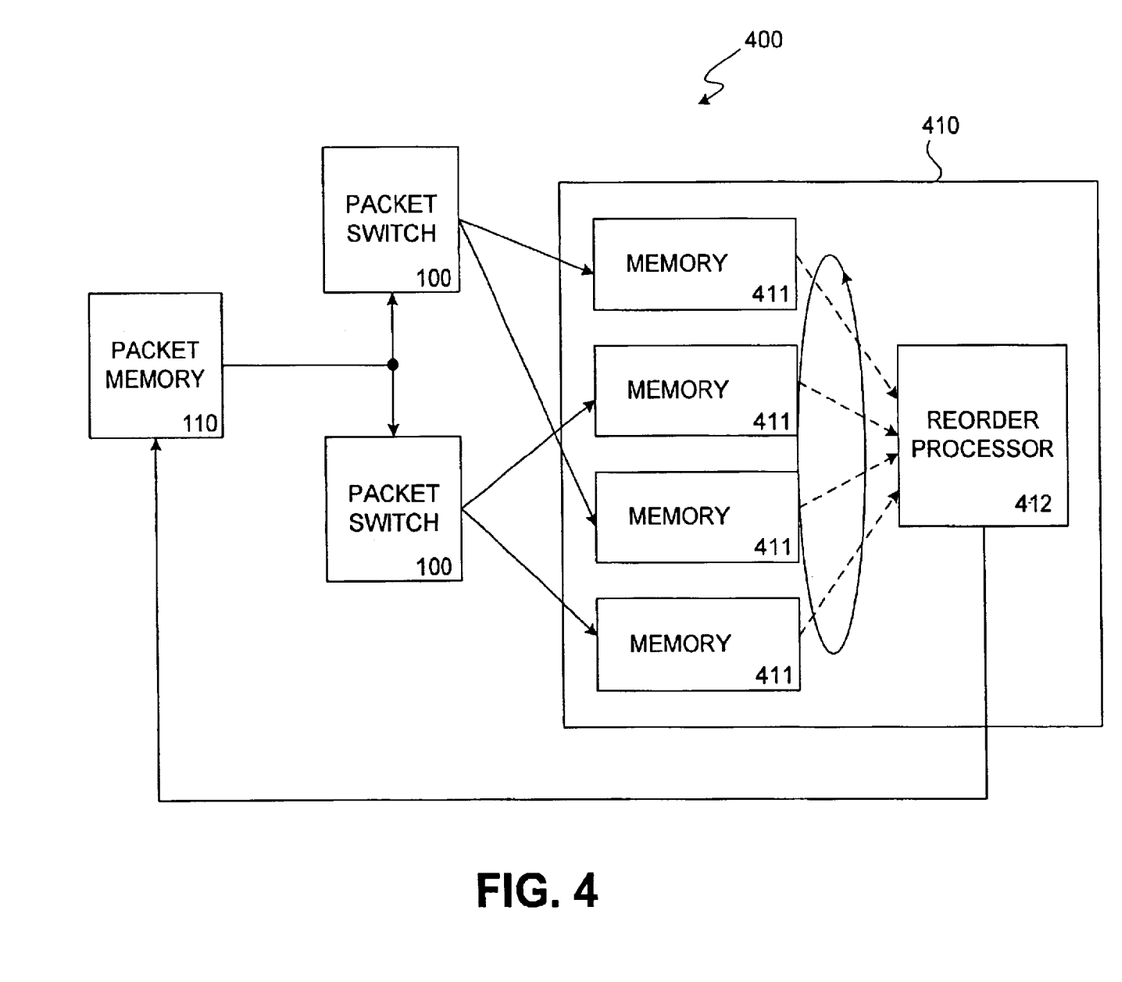
FIG. 4 shows a block diagram of a system having a plurality of packet switches in parallel.

FIG. 4 shows a block diagram of a system having a plurality of packet switches in parallel.

In a parallel system 400, the packet memory 110 is coupled in parallel to a plurality of (preferably two) packet switches 100, each constructed substantially as described with regard to FIG. 1. Each packet switch 100 takes its input from the packet memory 110. However, the output of each packet switch 100 is directed instead to a reorder stage 410, and an output of the reorder stage 410 is directed to the packet memory 110 for output to a network interface 101.

The output of each packet switch 100 is coupled in parallel to the reorder stage 410. The reorder stage 410 comprises a plurality of reorder memories 411, preferably two per packet switch 100 for a total of four reorder memories 411. The reorder stage 410 operates similarly to the reorder/rewrite memories 222 of the packet switch 100; the packet switches 100 write their results to the reorder memories 411, whereinafter a reorder processor 412 reads their results from the reorder memories 411 and writes them in the original arrival order of the packets 103 to the packet memory 110 for output to a network interface 101.

In a preferred embodiment where each packet switch 100 operates quickly enough to achieve an average switching speed of about 500 kilopackets per second and the reorder stage 410 operates quickly enough so that the pipeline is still balanced, the parallel system 400 produces a throughput of about 1,000 kilopackets switched per second.

Alternative embodiments of the parallel system 400 may comprise larger numbers of packet switches 100 and reorder/rewrite memories 411. For example, in one alternative embodiment, there are four packet switches 100 and eight reorder/rewrite memories 411, and the reorder stage 410 is greatly speeded up. In this alternative embodiment, the parallel system 400 produces a throughput of about 2,000 kilopackets switched per second.

Alternative Embodiments

Although preferred embodiments are disclosed herein, many variations are possible which remain within the concept, scope, and spirit of the invention, and these variations would become clear to those skilled in the art after perusal of this application.

We claim:

1. A system, comprising a packet memory;

N switch engines coupled to said packet memory;

NK reorder memories coupled to said N switch engines; and a reorder engine coupled to said plurality of reorder memories and disposed to receive packet headers from said reorder memories in an order in which they were originally received; wherein each one of said switch engines is independently coupled to a corresponding K of said reorder memories.

2. The system of claim 1, wherein K equals 2.

3. The system of claim 1, wherein N equals 2.

4. The system of claim 1, wherein N equals 4.

5. The system of claim 1, wherein each one of said N switch engines writes in sequence to said corresponding K reorder memories.

6. The system of claim 1, wherein each one of said NK reorder memories is processed globally.

7. The system of claim 5, wherein said reorder engine reads in sequence from each of said NK reorder memories.

8. The system of claim 5, wherein said reorder engine reads from each of said NK reorder memories in parallel with said N switch engines writing in sequence to said corresponding K of said reorder memories.

* * * * *